(12) United States Patent
Kaushik et al.

(10) Patent No.: US 7,254,746 B1
(45) Date of Patent: Aug. 7, 2007

(54) METHOD AND APPARATUS FOR USING A FAULT TOLERANT MEMORY IN PROCESSOR TESTING AND DESIGN

(75) Inventors: Pradeep Kaushik, Sunnyvale, CA (US); Dennis Wendell, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 631 days.

(21) Appl. No.: 10/778,945

(22) Filed: Feb. 13, 2004

(51) Int. Cl.
*G06F 11/00* (2006.01)
(52) U.S. Cl. ............................. 714/27; 714/30; 711/118
(58) Field of Classification Search ................. 714/27, 714/30; 711/118–122
See application file for complete search history.

(56) References Cited

U.S. PATENT DOCUMENTS

| | | | | |
|---|---|---|---|---|
| 5,204,836 A | * | 4/1993 | Reed | 365/200 |
| 5,537,665 A | | 7/1996 | Patel et al. | 395/182.03 |
| 6,011,733 A | * | 1/2000 | Fischer et al. | 365/200 |
| 6,021,512 A | * | 2/2000 | Lattimore et al. | 714/710 |

OTHER PUBLICATIONS

S. Bhutani et al., "Processor Having a Coalescing Cache Disable Mode," U.S Appl. No. 10/766,745, filed Jan. 27, 2004.

R. Heald et al., "A Third-Generation SPARC V9 64-b Microprocessor," IEEE JSSC, Nov. 2000, pp. 1526-1538.

G. Konstadinidis et al., "Implementation of a Third-Generation 1.1GHz 64b Microprocessor," 2002 IEEE International Solid-State Circuits Conference, Session 20/Microprocessors/20.3.

G. Konstadinidis et al., "Implementation of a Third-Generation 1.1GHz 64b Microprocessor," 2002 IEEE Journal of Solid-State Circuits, vol. 37, No. 11, Nov. 2002, pp. 1461-1469.

B. McCarroll et al., "High-Speed CMOS Comparator for Use in an ADC," IEEE JSSC, Feb. 1988, pp. 159-165.

D. Wendell et al., "A 4 MB On-Chip L2 Cache for a 90nm 1.6GHz 64 bit Microprocessor," IEEE JSSC, Feb. 2004.

* cited by examiner

*Primary Examiner*—Gabriel Chu
*Assistant Examiner*—Tim Bonura
(74) *Attorney, Agent, or Firm*—Dorsey & Whitney LLP

(57) ABSTRACT

An apparatus and method for controlling and providing a robust, single entry cache memory is described in connection with an on-board cache memory integrated with a microprocessor. By implementing the single entry cache memory in a redundancy array of the cache memory, CPU debug procedures may proceed independently of the cache debug by disabling part of the cache memory and enabling a dedicated single entry cache in the redundancy array. Use of a cache redundancy array for the single entry cache imposes no area or latency penalties because the existing cache redundancy array already matches the latency of the cache.

19 Claims, 6 Drawing Sheets

METHOD AND APPARATUS FOR USING A FAULT TOLERANT MEMORY IN PROCESSOR TESTING AND DESIGN

BACKGROUND OF THE INVENTION

1. Field of the Invention

The present invention relates generally to the field of microprocessor design and operation. In one aspect, the present invention relates to a fault tolerant memory for use in designing and debugging a CPU.

2. Description of the Related Art

Computer systems are constructed of many components, typically including one or more processors that are connected for access to one or more memory devices (such as RAM) and secondary storage devices (such as hard disks and optical discs). For example, FIG. 1 is a diagram illustrating a multiprocessor system 10 with multiple memories. Generally, a processor 1a connects to a system bus 12. Also connected to the system bus 12 is a memory (e.g., 14a). During processor operation, CPU 2 processes instructions and performs calculations. Data for the CPU operation is stored in and retrieved from memory using a memory controller 8 and cache memory, which holds recently or frequently used data or instructions for expedited retrieval by the CPU 2. Specifically, an L1 cache 4 connects to the CPU 2, followed by an L2 cache 6 connected to the L1 cache 4. The CPU 2 transfers information to the L2 cache 6 via the L1 cache 4.

As will be appreciated, there can be performance inter-dependencies between the various components of a computer system. For example, in systems where the L1 cache 4 transfers information using one line width (e.g., 32 bytes at a time) and the L2 cache 6 and the memory controller 8 transfer information using a different line width (e.g., 64 bytes at a time) to the system bus 12, the performance of the CPU 2 depends on the data merging or coalescing function provided by the L2 cache 6. This function may be implemented by including a plurality of cache lines in the L2 cache (e.g., each cache line 255 having a 64 byte capacity) for storing information between transfers.

This performance inter-dependence can adversely affect the design and performance of processor devices, particularly where the components are integrated on a single chip, since the initial silicon implementation of an integrated circuit often includes errors and bugs. In particular, if any of the components (such as the CPU 2, the L1 cache 4, or the L2 cache 6) fails to yield during manufacturing, the processor will not function. Such a failure can be caused by contaminants that are present during manufacture of the processor circuit, and can also be caused by bugs or errors that are present in the design or instruction set for the CPU 2. And as the circuit size, density and complexity increase, there are more opportunities for physical and circuit defects in the constructed integrated circuits. While the processor can be tested to identify and remove bugs or defects, such testing is impeded if it can not be determined what part of a complex integrated circuit is causing the defect. For example, if the L2 cache 6 is the only nonfunctioning portion of the processor, it is not possible to test the remaining portions of the processor during processor design because multiple bytes must coalesce within the cache. Subsequently, by not testing the processor, the design stage is delayed as processor manufacturers attempt to yield a processor with a functioning L2 cache 6.

Such delays can be substantial and can impede circuit design efforts. For example, conventional CPU pipeline debug operations can take up to a year or more to perform, but when a CPU is integrated on a single chip with additional circuitry that has its own complexities and potential for defects, the debug operations are further delayed while the additional circuitry is debugged or corrected. Thus, there is a need for a scheme which accelerates the design of a primary circuit (such as a CPU or microprocessor) and minimizes the design delay effects caused by the presence of errors or defects in a secondary circuitry (such as an on-board cache) that is associated with the primary circuit. There is also a need for accelerating the testing of a processor with a nonfunctioning coalescing cache to reduce the time and expense used in processor testing and manufacturing. Further limitations and disadvantages of conventional systems will become apparent to one of skill in the art after reviewing the remainder of the present application with reference to the drawings and detailed description which follow.

SUMMARY OF THE INVENTION

Broadly speaking, the present invention is a method and system for using a selected portion of a redundancy cache array for processor testing. By disabling the main cache array and enabling a limited entry cache in the redundancy cache array, the processor can continue to operate for testing regardless of the operating state of the main cache array, and can do so using an area-efficient memory that matches the overall cache latency. It should be appreciated that the present invention can be implemented in numerous ways, such as a process, an apparatus, a system, a device or a method on a computer readable medium. Several inventive embodiments of the present invention are described below.

In accordance with various embodiments of the present invention, a method and apparatus provide dedicated cache memory for use in CPU operations. In a selected embodiment, a selected portion of a cache memory redundancy array is used as a dedicated cache memory for CPU debug operations. By disabling the remainder of the cache memory and using only the cache redundancy array, the CPU portion of a processor can operate for testing purposes without incurring any latency penalty of using a non-cache memory, regardless of the state of the main cache array. Since such a use of the redundancy array precludes implementation of conventional cell replacement redundancy schemes for the cache memory, fault tolerant performance for the dedicated cache memory during device startup may be achieved by simultaneously writing and reading data to multiple cells in the dedicated cache memory. For example, if one wordline of the cache redundancy array is used for the dedicated cache memory, the memory may be made robust by simultaneously writing or reading data on multiple columns so that the cache still works, even if there is a defective cell in one of the cells.

The objects, advantages and other novel features of the present invention will be apparent to those skilled in the art from the following detailed description when read in conjunction with the appended claims and accompanying drawings.

DETAILED DESCRIPTION

A method and apparatus for providing a robust memory implemented using an isolated, dedicated portion of a cache memory for CPU initialization and/or debug operations is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of microprocessor design to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
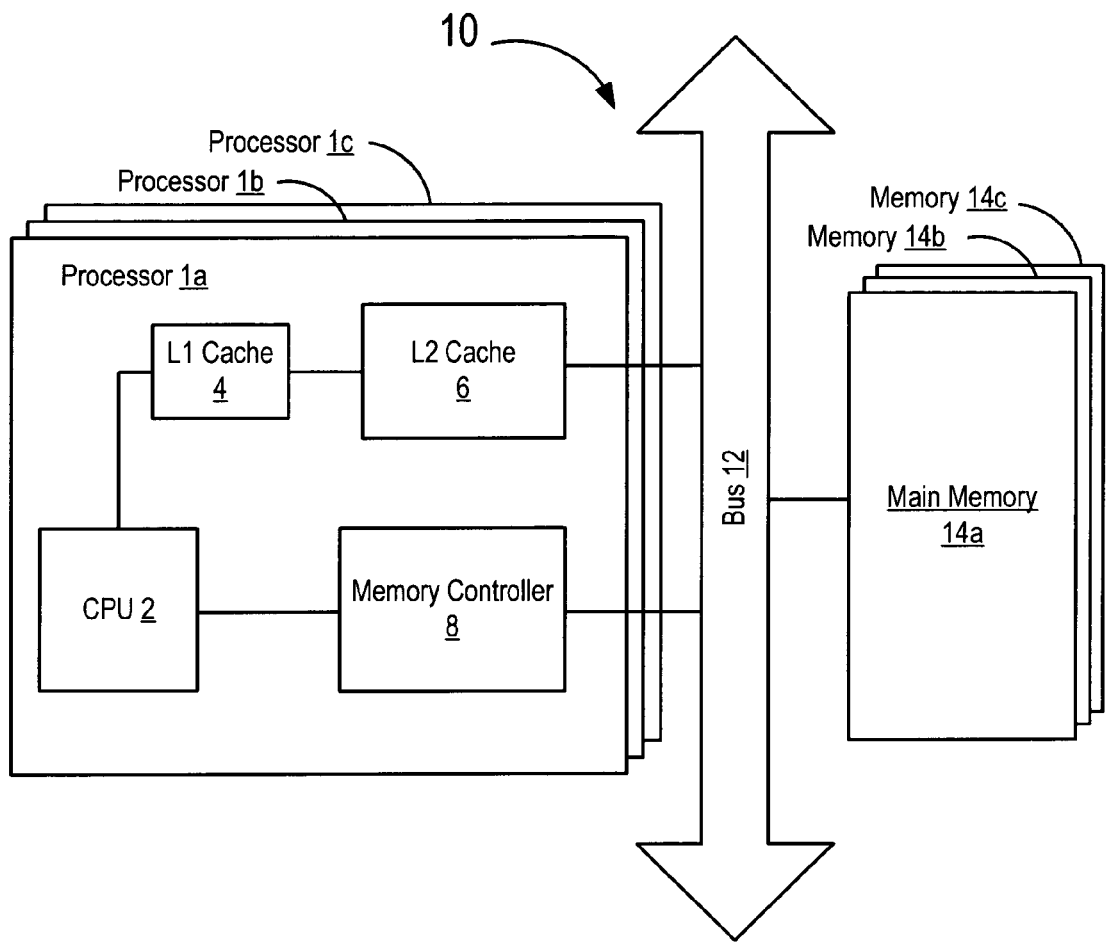
FIG. 1 illustrates a computer system with multiple memories, including cache memory.
Figure 2:
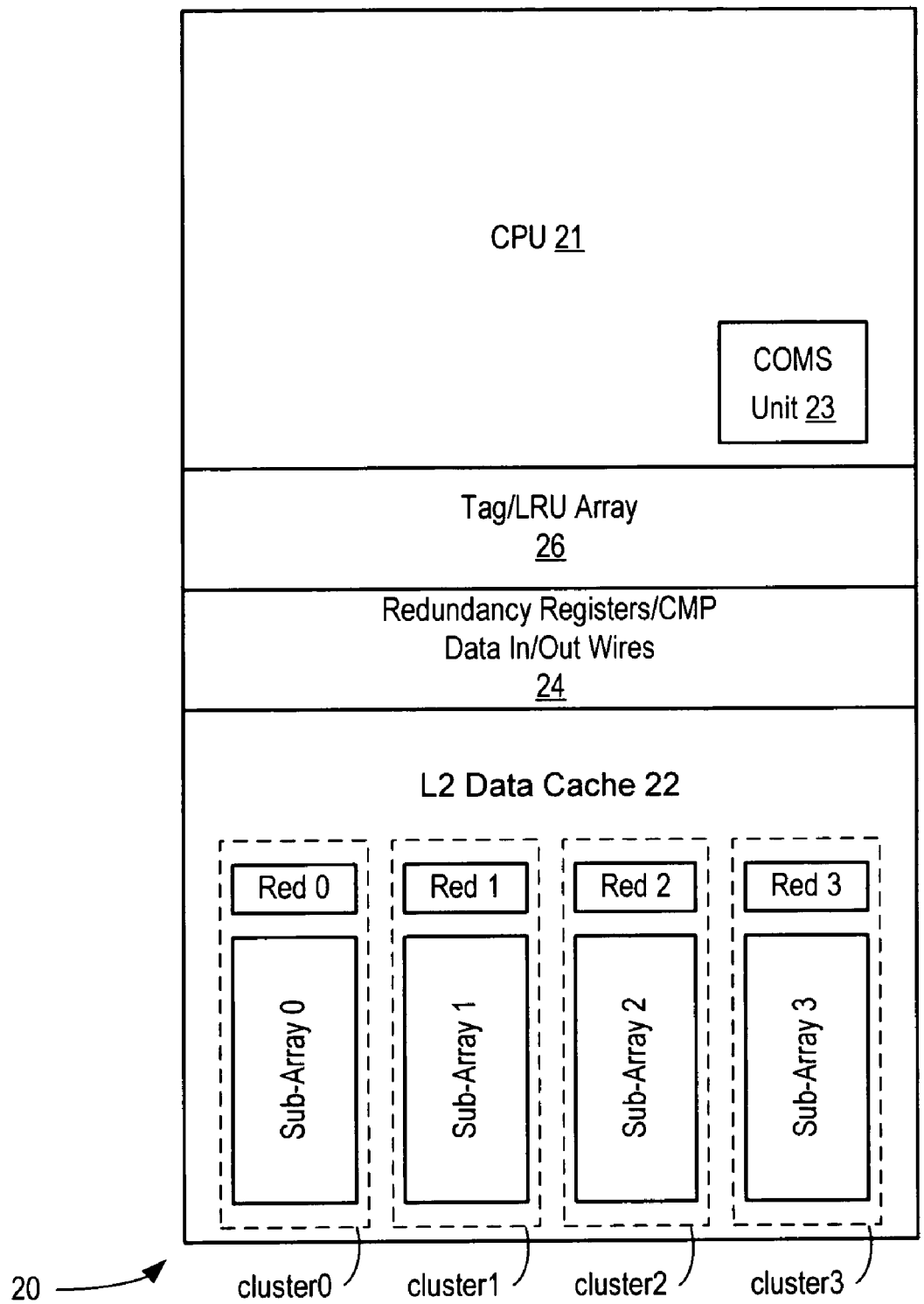
FIG. 2 illustrates the main functional blocks of a microprocessor system using the single entry robust cache memory system of the present invention.

Referring now to FIG. 2, a block diagram depicts a method and apparatus for providing a single entry cache in a redundancy array of a processor circuit 20. The processor circuit 20 may be found in many forms including, for example, the 64-bit SPARC RISC microprocessor from Sun Microsystems, or any 32-bit or 64-bit microprocessor manufactured by Motorola, Intel, AMD or IBM. However, any other suitable single or multiple microprocessors, microcontrollers or microcomputers may be utilized. A typical processor circuit 20 includes at least a microprocessor or central processing unit (CPU) 21 and on-chip memory (e.g., L2 Data Cache 22). As will be appreciated, the processor circuit 20 may also include other components, such as an L1 cache memory (not shown) to facilitate quicker data access for the CPU 21. In addition, the processor circuit 20 will be connected to external devices, such as main RAM memory, via a memory or system bus interface or bridge. Thus, persons skilled in the art will recognize that the foregoing components and devices are used as examples for sake of conceptual clarity and that various configuration modifications are common.

For purposes of providing an exemplary and not limiting description, it will be useful to describe the various aspects and embodiments of the invention herein in the context of an on-chip cache memory structure that is constructed with CMOS SRAM memory cells. However, the present invention is not limited to CMOS-based processes and may be used in connection with other categories of memory products, including without limitation, DRAM, ROM, flash, PLA and the like, whether integrated within a VLSI system, cache or non-cache, or a stand alone memory device. In connection with the example described herein and depicted in FIG. 2, the CPU 21 uses a cache memory system 22 to speed memory access and to overcome the delays imposed by accessing remote memory subsystems 14. Cache memory comprises one or more levels of dedicated high-speed memory holding recently accessed data, designed to speed up subsequent access to the same data. When data is read from main memory, a copy is also saved in the cache 22, and the tag array 26 stores an index to the associated main memory. The cache 22 then monitors subsequent requests for data to see if the information needed has already been stored in the cache 22. If the data had indeed been stored in the cache (i.e., a "hit"), the data is delivered immediately to the CPU 21 and the attempt to fetch the information from main memory is aborted (or not started). If, on the other hand, the data had not been previously stored in cache (i.e., a "miss"), then it is fetched directly from main memory and also saved in the cache for future access. Though depicted in FIG. 2 as a secondary cache (L2), the present invention may be advantageously applied with other types of memory, including primary cache memory, tertiary cache memory or even main memory.

As integrated circuit devices become more and more dense and/or are integrated with other circuitry (such as the integration of processor 2, L1 cache 4 and L2 cache 6), the overall circuit becomes more and more susceptible to the presence of defects which could impede or corrupt the flow of data through any of the desired paths. A specific example of such a complex integrated circuit system is shown in FIG. 2, which depicts the main functional blocks of a 90 nm technology, 64 bit, 1.6 GHz, four-instruction-issue SPARC (TM) RISC microprocessor 20 that supports one- to four-way high-end desktop workstations and workgroup servers. This microprocessor device includes a central processor unit (CPU) 21 that is integrated with a 4 MByte on-chip L2 cache 22 that is fabricated using an 8-metal-layer 90 nm CMOS process technology. In this exemplary implementation, the 4 MByte L2 Data Cache 22 is organized as a four-way set associative memory, with 16,384 entries, a 64 Byte block size, and a 256 bit cache line size. The addressing uses 14 index bits, 19 tag bits, and 28 total tag bits per way after including ECC and coherence bits. The data array uses 9 bit/16 Byte ECC error correction bits. Data array latency/throughput is 8/2 clock cycles, while the Tag/LRU array latency/throughput is 3/1 for snoop operations and hit/miss signals. The cache is physically indexed and physically tagged, and implements an LRU (least recently used) line replacement algorithm that incorporates write-back and write-allocate. It is a write-back write-allocate cache supporting a modified-owned-exclusive-shared-invalid (MOESI) cache coherence protocol.

In a selected embodiment of the processor circuit 20 illustrated in FIG. 2, the CPU 21 can transfer information either 1, 2, 4, 8, or 16 bytes at a time, though other byte sizes are possible. In addition, the L2 cache may provide a coalescing function for controlling data transfer to and from main memory. To assist with CPU test and debug operations, a "cache off" mode select (COMS) unit 23 is included in the processor 20 in order to allow CPU pipeline debug to progress independently of the L2 cache process yield curve. The COMS unit 23 is operative to disable access to the main cache array (Sub-Array0, Sub-Array 1, Sub-Array2, Sub-Array 3) and to connect the CPU 21 to a limited entry cache contained within one of more of the cache redundancy arrays (Red 0, Red 1, Red 2, Red 3). In this way, a limited entry cache may be connected to the CPU 21 and system bus. Use of the existing cache redundancy arrays permits CPU test conditions to match actual device performance, both in terms of timing (i.e., latency matching) and functionality (i.e., data coalescing), without requiring additional circuitry that consumes valuable silicon real estate.

As depicted in FIG. 2, the cache array 22 may be organized into multiple clusters (cluster0, cluster1, cluster2 and cluster3), with each cluster including a sub-array (e.g., Sub-Array 0) and redundant array (e.g., Red 0). Though the redundant arrays in FIG. 2 are illustrated as being separately positioned at the periphery of the sub-arrays (such as might occur when providing row redundancy elements), redundant rows and/or columns may also be incorporated integrally within the sub-array, such as by physically locating redundant columns adjacent to the primary sub-array columns. The collection of sub-arrays and/or redundant arrays may be referred to as the main memory array or "pitch," to borrow an expression from the sporting vernacular. Access to the data cache is provided through the L2 cache control circuit in the CPU 21, tag/LRU array 26 and redundancy control circuit 24 which is physically separate from the memory array, though formed on the integrated circuit substrate for the microprocessor 20. As described more fully in the co-pending application entitled "Off-Pitch Column Redundancy Using Dynamic Shifters," (which was filed on Feb. 13, 2004 and is hereby incorporated by reference in its entirety), the redundancy control circuit 24 implements a redundancy scheme for the device 20 that uses an off-pitch dynamic shift circuit that is shared by the sub-arrays in a particular cluster (e.g., cluster0). In accordance with the present invention, the existing redundancy arrays in the cache 22 may be used for CPU testing by including a cache mode selection functionality to provide a limited entry cache that may be de-coupled from the remaining cache and used for CPU debug operations.

Figure 3:
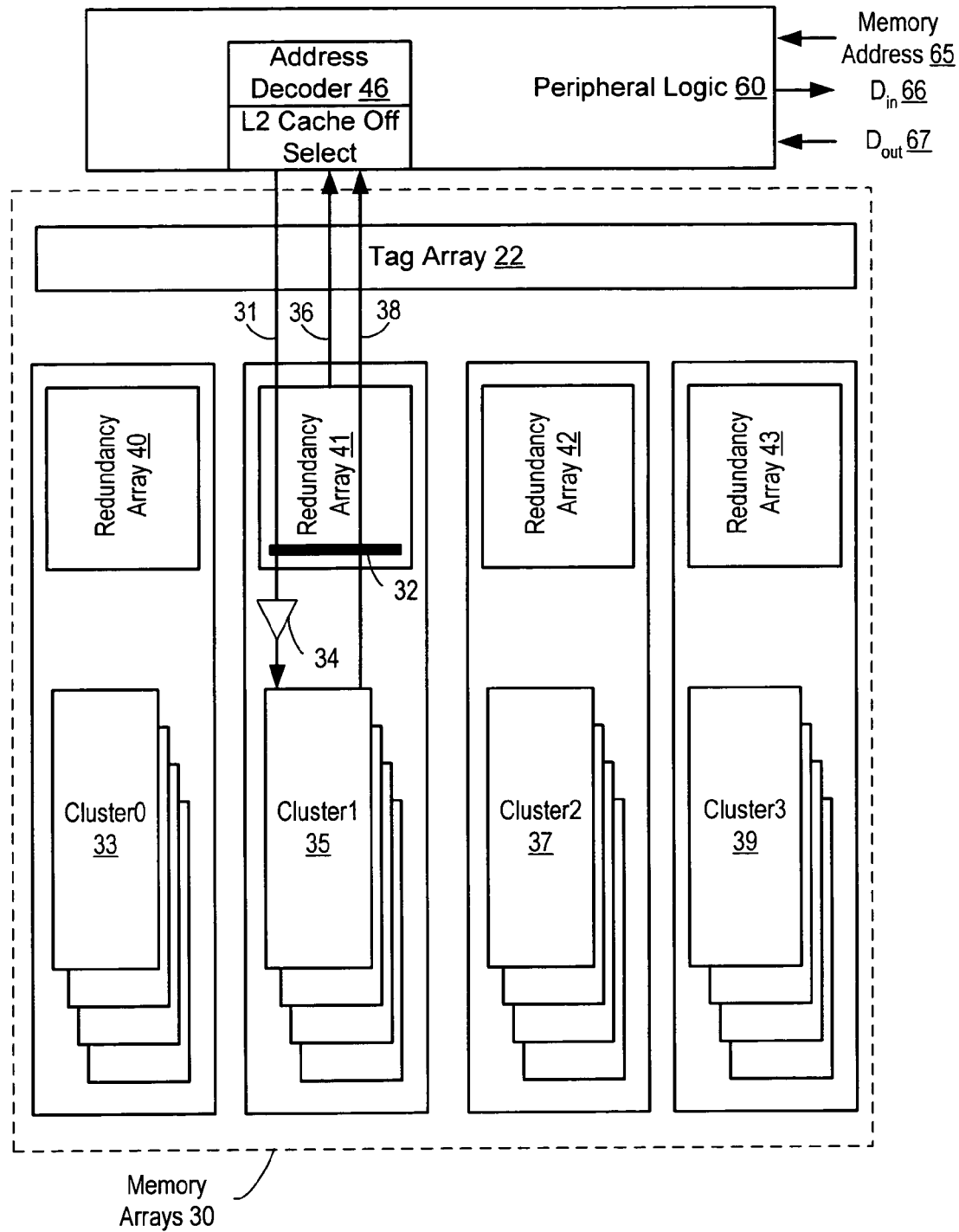
FIG. 3 illustrates additional details of a selected memory embodiment of the present invention.

FIG. 3 illustrates additional details of a selected memory embodiment of the present invention, wherein a single entry cache is provided as part of the existing cache redundancy array that is connected to the CPU (not shown) via peripheral logic 60. While an external limited entry cache memory may be provided as a separate collection of flip-flops and external SRAM cells (such as described in U.S. patent application Ser. No. 10/766,745 entitled "Processor Having A Coalescing Cache Disable Mode" and filed on Jan. 27, 2004, which is hereby incorporated by reference as fully set forth herein), such an additional stand-alone memory imposes an area penalty and potential latency matching requirements. The present invention avoids such issues by providing a robust limited entry cache 32 within the existing memory array 30. For example, the limited entry cache 32 may be provided as part of a cache redundancy array 41 for storing the data portion of any cache entry. In this implementation, the data portion 52 of the limited entry cache can be stored in the rows of one or more of the redundant cache arrays 40-43. In addition, the tag array 45 may be configured to store tag information for identifying the limited entry cache 32 when the cache off select circuit 44 isolates the main cache arrays (Cluster0, Cluster1, Cluster2, Cluster3) from the CPU.

As illustrated in FIG. 3, the limited entry cache 32 may be used as a dedicated memory by using only a portion of the existing memory for the CPU test procedures and applications. For example, a dedicated memory may be implemented as part of the memory array 30 which is constructed of a plurality of clusters or sub-arrays (e.g., cluster 33) and a plurality of redundant elements (e.g., redundant array 40). While the redundant elements (e.g., 40) are illustrated as being a separate array, they may also be positioned at the periphery of each cluster (e.g., 33). As will be appreciated, an access to a cell in the dedicated memory 32 of the redundancy array (e.g., redundancy array 41) may be affected by a defect in the column for that cell if that column also extends through the main memory (e.g., cluster1 35). For example, this can occur if there are metal problems (such as a short in one of the metal lines) on the main cache column that is associated with the single entry cache cell(s). To address this, the redundancy array 41 containing the dedicated memory may be isolated from the main memory by appropriate placement of repeater or other isolation circuits between the redundancy array 41 and the main memory 35. In one implementation depicted in FIG. 3, a repeater circuit 34 is placed on the column wire between the single entry cache cell(s) in the redundancy array 41 and its associated main cache memory 35. In addition or in the alternative, an L2 cache off select circuit 44 may be provided to partially disable the multi-cluster memory array 30 so as to de-couple the main array components 33, 35, 37, 39 from the CPU to permit independent testing of the CPU. Such an arrangement permits testing of the CPU and L2 cache array 30 to proceed independently of one another. In particular, by designating a selected portion of the memory array 30 for use in CPU debug tests and isolating the remainder of the memory array 30, test operations on the CPU may proceed without having to first debug the memory array 30.

In a selected embodiment, the dedicated memory may be a single entry cache memory 32 that is implemented in a redundancy array 41, such as by dedicating one wordline from the redundancy array 41 for use by the CPU. With a single entry cache, all addresses to the memory are sent to the same physical location in the memory array 30. As will be appreciated, a variety of test procedures and other CPU applications require only a limited amount of cache memory. By using part of an existing cache memory array, there is no area penalty paid. In addition, such an approach avoids any latency matching issues where the redundancy array has already been designed to meet the latency of the cache.

In the embodiment depicted in FIG. 3, a memory array 30 includes a single entry cache 32 constructed of a plurality of storage cells (e.g., 1154 cells) from the redundant cache array 41. These storage cells are connected to address decoding circuitry 46 in the peripheral logic. The address decoder circuit 46 receives address information from the tag portion of the single entry cache 50. After receiving the address information, the address decoder circuit 46 decodes the specific storage cells in the redundant cache array 41 to access and output. Thus, the data portion 52 or any part thereof, from the redundant cache array can be selected.

As illustrated in FIG. 3, the redundant cache array 41—in addition to being connected to data input lines 31 (only one is shown) and data output lines 38 (only one is shown) that couple the array 30 and peripheral logic—is provided with separate data output lines 36 (only one is shown) for coupling the redundant cache array 41 and peripheral logic section 60. The separate data output 36 helps isolate the redundant cache array 41 from any defects in the main cache array 35.

When implementing the dedicated memory as a single entry in the redundancy array, any defects in the portion of the redundancy array used for the dedicate memory cannot be corrected by the redundancy scheme for the array 30. Thus, in accordance with a selected embodiment of the present invention, the dedicated memory is made more robust by using multiple columns during the read and write operations to the single entry cache 32. The result is that each bit in the entry is stored in multiple cells in the array. While four columns of the redundancy array 41 may be simultaneously accessed in accordance with a selected embodiment, it is contemplated that more or fewer columns may be used, and that other combinations of columns, rows and redundancy arrays may be used to implement the present invention. By simultaneously writing or reading to multiple columns at the designated wordline and combining the access results (such as by using a four-to-one multiplex circuit or any other cumulative circuit structure), the plurality of addressed memory cells effectively serve as a fault tolerant memory element in that any single defect relating to the addressed cells will not affect the storage result for the dedicated memory. Thus, even if there is one bad cell in the four cells, the circuit still works. It is contemplated that other winner-take-all circuit and logic implementations may also be used to provide robust memory performance with the single cache entry. In this implementation, the sense amplifier and bitline circuits used for normal read and write operations are used for the limited cache entry operations to detect and amplify the data values stored in individual cells of the array 41 by simultaneously executing multiple column selects so that data from the selected cells is read or written together using a winner-take-all function. For example, by turning on all four column multiplexer select lines to the four bitline pairs (in both read and write operations), if three out of the four cells contain a "1" data polarity, the three cells will win against any disagreeing data cell. With each individual bit of the entry being written to multiple storage cells (e.g., four cells) and being detected with the winner-take-all implementation—alone or in combination with the use of multiple bits (e.g., 32 bits) per bitline in the redundancy array—the sense levels are robust.

When the dedicated memory is implemented as part of the redundancy array in the cache memory of a microprocessor system, cache-related interference problems may be prevented by disabling at least a portion of the cache array that might otherwise interfere with the dedicated memory. For example, by turning off or disabling the main arrays or clusters 33, 35, 37, 39 in memory array 30, the CPU may proceed with debug operations independently of the process yield curve for the entire memory array 30.

Figure 4:
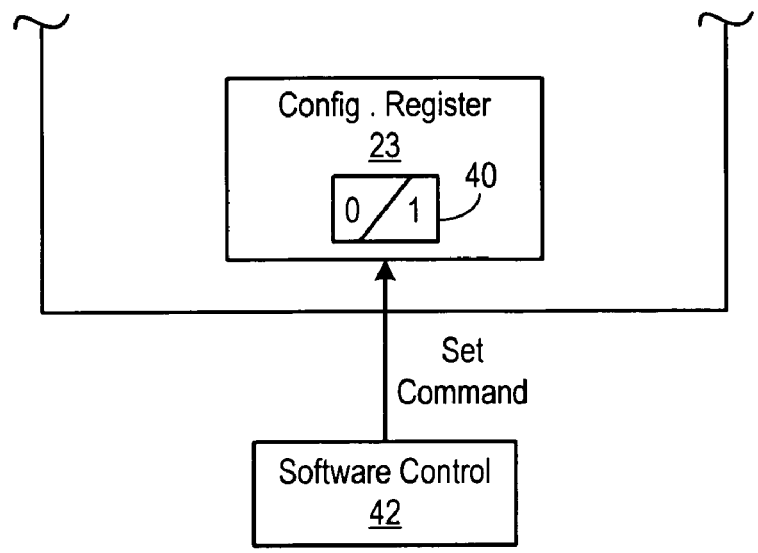
FIG. 4 is a diagram illustrating a configuration register in accordance with an embodiment of the invention.

FIG. 4 is a diagram illustrating a configuration register for implementing a cache mode selection functionality in accordance with an embodiment of the invention. The COMS unit 23 includes a configuration register 40 capable of disabling access to the main cache array (Sub-Array0, Sub-Array 1, Sub-Array2, Sub-Array 3) of the L2 cache 22. By disabling access to the main cache array, the COMS unit 23 permits cache operations to be implemented by a dedicated address in one of more of the cache redundancy arrays (Red 0, Red 1, Red 2, Red 3). For example, a single entry in one of the cache redundancy arrays may be used for CPU testing to coalesce or merge information (such as an instruction or a group of instructions) that has a word size of 32 bytes into information that has a word width of 64 bytes, though other word width conversions could also be implemented.

During operation, a software control 42 issues a set command to the configuration register 40 to disable access to the main sub-arrays in the L2 cache 22. For example, if a zero indicates the state where access to the L2 sub-arrays is enabled, then when the software control 42 issues the set command, the "zero" in the configuration register changes to a "one," which indicates the state where access to the L2 cache sub-arrays is disabled. Alternatively, in other embodiments, the configuration register 40 can represent the state where access to the L2 cache sub-arrays, or individual sub-arrays, is enabled or disabled with values greater than a single bit value.

Figure 5:
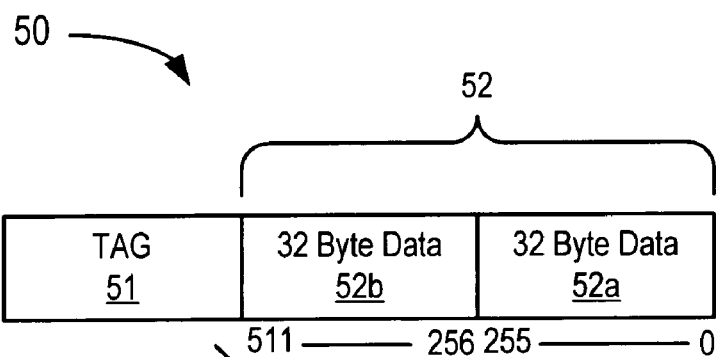
FIG. 5 is a diagram illustrating a single entry cache in accordance with an embodiment of the invention.

FIG. 5 is a diagram illustrating a single entry cache 50 in accordance with an embodiment of the invention. The single entry cache 50 stores information in a tag portion 51 and a data portion 52. For example, if the full word width for the system bus is 64 bytes of data, then the data portion 52 comprises a first data portion 52a and a second data portion 52b, each capable of storing 32 bytes of data, but in total, capable of storing 64 bytes of data. Thus, when transferring data to the CPU 21, the first data portion 52a and the second data portion 52b are selectable from the data portion 52. In other embodiments, the present invention may be implemented with a single entry cache 50 that can store full word widths, including any byte size greater or less than 64 bytes, or may be implemented with a limited or dedicated portion of the cache redundancy array for storing a plurality of entries.

Figure 6:
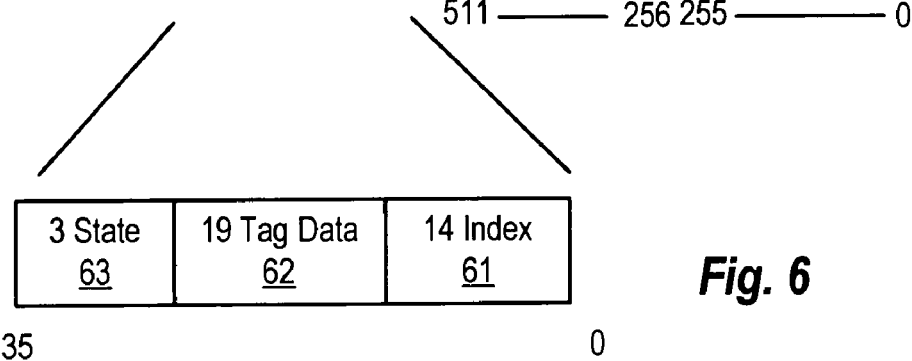
FIG. 6 is a diagram illustrating a tag portion in the limited entry cache in accordance with an embodiment of the invention.

In an example embodiment, the tag portion 51 processes the coalescing of bytes within the single entry cache 50. Specifically, FIG. 6 is a diagram illustrating the tag portion 51 in the single entry cache 50 in accordance with an embodiment of the invention. The tag portion 51 can include groups of index bits 61, tag data bits 62, and state bits 63. In one embodiment, the index bits 61 can have fourteen bits, the tag data bits 62 can have nineteen bits, and the state bits 63 can have three bits. The index bits 61 in combination with the tag data bits 62 define an address for selecting the data portion 52, the first data portion 52a, and the second data portion 52b. The state bits 63 define the state of a line in a cache. For example, a snoopy protocol used in cache coherence can be implemented with the state bits 63. Other embodiments can have any number of bits in the tag portion 51.

Figure 7:
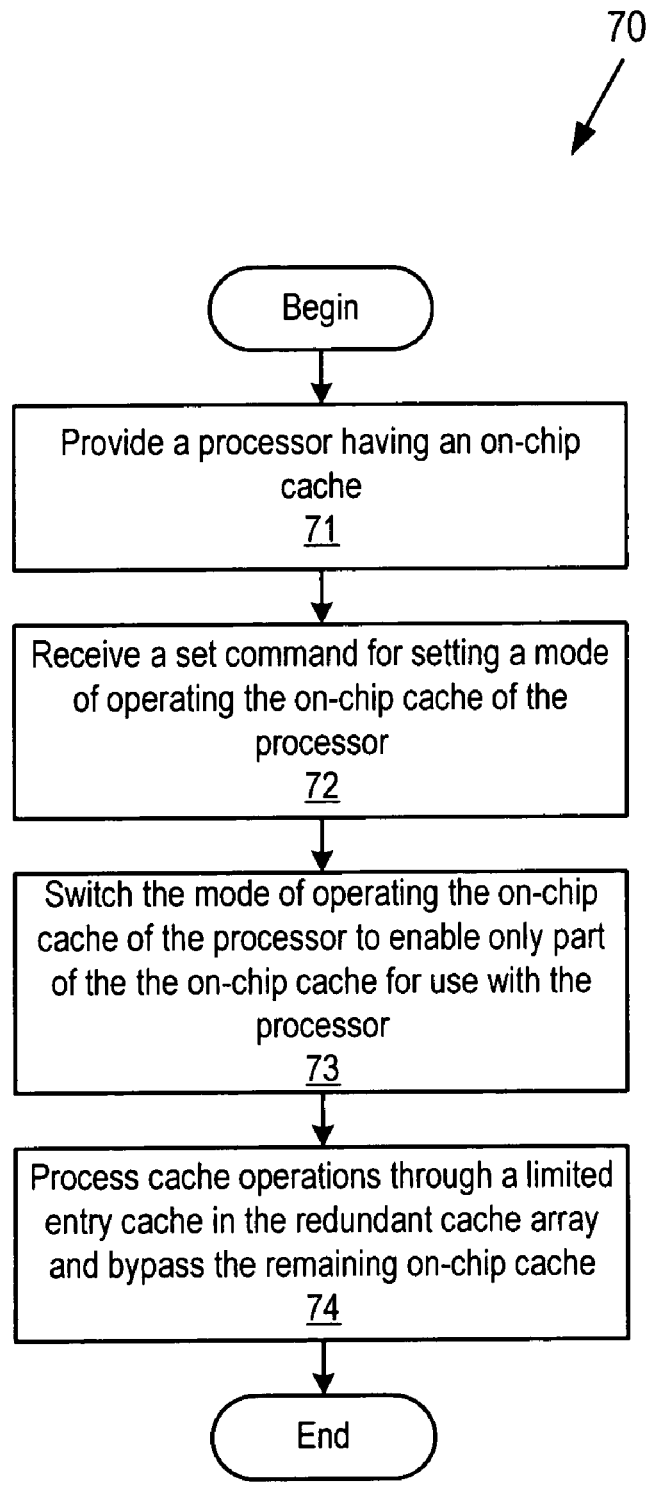
FIG. 7 is a diagram of a method for enabling the limited entry cache in accordance with an embodiment of the invention.

FIG. 7 is a diagram of a method for activating a limited entry cache in accordance with an embodiment of the invention. An enabling method 70 begins with an operation 71 for providing a processor having an on-chip memory capable of storing or caching data. Then, in operation 72, the cache off select mode is implemented to activate the main cache memory array, such as by having the COMS unit 23 receive a set command for setting a mode of operating the on-chip cache of the processor. As will be appreciated, operation 72 can also be skipped. In operation 73, the COMS unit 23 switches the mode of operating the on-chip cache of the processor to enable testing of the processor by partially disabling the on-chip cache. Specifically, the COMS unit 23 enables limited access to the limited entry cache (e.g., cache line 32) in the redundant cache array and disables access to the remainder of the on-chip cache. Limited access may include providing isolation between the main arrays and redundant arrays, such as by selectively disabling repeater circuits between the arrays and/or including separate input/output lines for the redundant arrays. Finally, the enabling method 70 ends after operation 74, where the limited entry cache is used by the CPU for caching operations, and the remainder of the on-chip cache is bypassed. To provide a robust limited entry cache with the redundancy array, individual data values from the entry may be stored in multiple cells in the array and simultaneously detected and/or combined to obtain a winner-take-all result.

Figure 8:
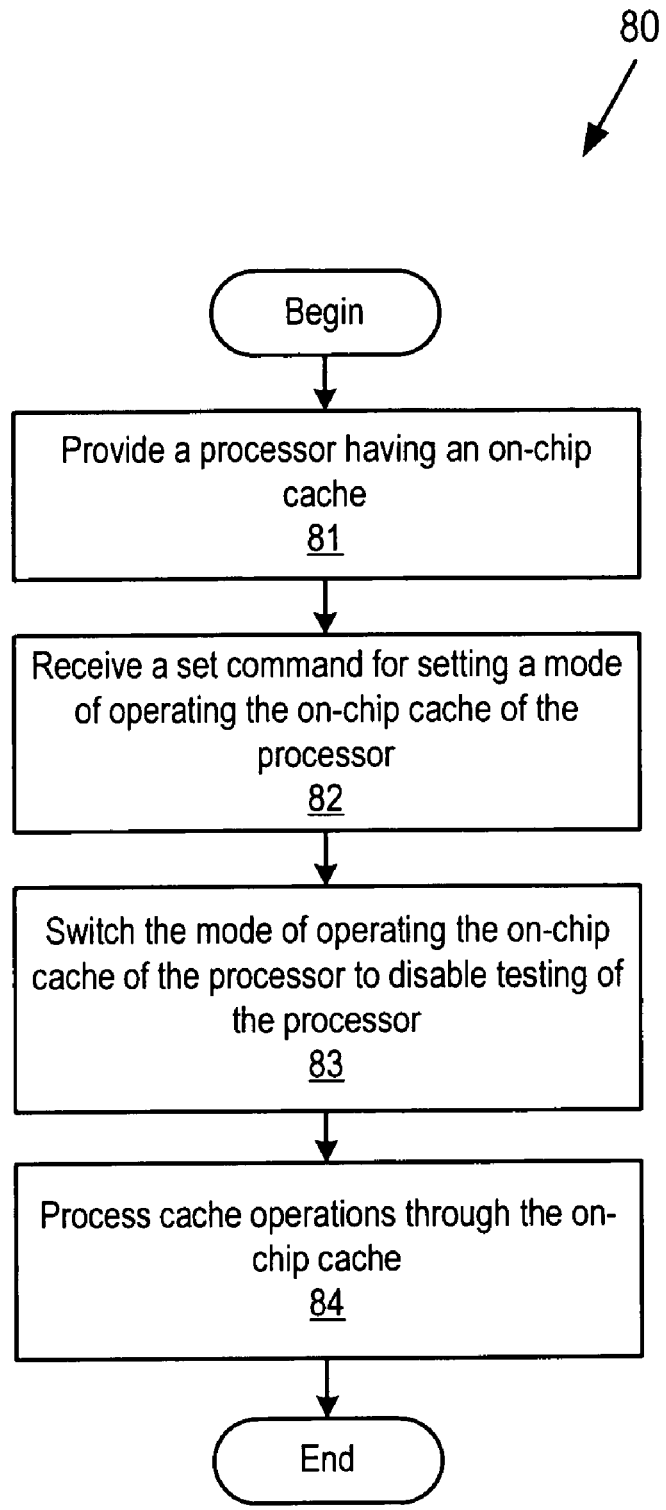
FIG. 8 is a diagram of a method for disabling the limited entry cache in accordance with an embodiment of the invention.

FIG. 8 is a diagram of a method for disabling the limited entry cache in accordance with an embodiment of the invention. A disabling method 80 begins with an operation 81 for providing a processor having an on-chip memory capable of storing or caching data. Then, in operation 82, the cache off select mode is implemented to activate the main cache memory array, such as by having the COMS unit 23 receive a set command for setting a mode of operating the on-chip cache of the processor. As will be appreciated, operation 82 can also be skipped. In operation 83, the COMS unit 23 switches the mode of operating the on-chip cache of the processor to disable testing of the processor. Specifically, the COMS unit 23 fully enables access to the entire on-chip cache array. Finally, the disabling method 80 ends after operation 84, where the entire on-chip cache processes all cache operations.

In accordance with a selected embodiment, the methods and systems for using a single entry in a redundancy array to provide a robust cache implementation as shown and described herein may be implemented in software stored on a computer-readable medium and executed as a computer program on a general purpose or special purpose computer. The invention, for example, can be implemented in connection with any CPU test program that is used to debug components on an integrated circuit, such as a microprocessor circuit. The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled or wirelessly connected computer system so that the computer readable code is stored and executed in a distributed fashion. For clarity, only those aspects of the software germane to the invention are described, and product details well known in the art are omitted. For the same reason, the computer hardware is not described in further detail. It should thus be understood that the invention is not limited to any specific computer language, program, or computer.

While the present invention has been particularly described with reference to FIGS. 1-8 and with emphasis on certain memory structures, it should be understood that the figures are for illustration purposes only and should not be taken as limitations upon the present invention. In addition, it is clear that the method and apparatus of the present invention has utility in any application where a limited portion of a memory may be used without requiring access to the entire memory. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A processor for executing instructions, comprising:
   a CPU for executing the instructions;
   a cache memory comprising a main array and a redundancy array, said redundancy array comprising a limited entry cache;
   a cache mode select unit configured to disable the main array and enable only the limited entry cache to perform cache operations for the CPU;
   a first data output line for reading data from the cache memory in an operative mode; and
   a second data output line for reading data from the limited entry cache in a test mode.

2. The processor of claim 1, wherein the limited entry cache comprises a single entry cache.

3. The processor of claim 1, wherein the cache memory is a high capacity storage unit capable of storing a plurality of cache lines, each cache line further capable of storing one of a full word width and a portion of the full word width.

4. The processor of claim 1, wherein the cache memory comprises a secondary cache memory that is integrated on a common semiconductor substrate with the CPU.

5. The processor of claim 1, comprising an isolation circuit coupled between the main array and redundancy array for isolating the redundancy array.

6. The processor of claim 1, wherein the limited entry cache stores individual data bits of an entry in multiple storage cells.

7. The processor of claim 6, comprising a multiplex circuit for simultaneously writing data to the multiple storage cells.

8. The processor of claim 6, comprising a detector circuit for simultaneously reading data from the multiple storage cells using a winner-take-all detection logic.

9. The processor of claim 1, wherein the cache mode select unit may be configured to enable only the limited entry cache to perform cache operations for the CPU during CPU debug tests.

10. A method for testing a processor having on-chip cache, comprising:
    providing a processor having an on-chip cache comprising a main cache array and a redundancy cache array;
    issuing a set command for setting a mode of operating the on-chip cache of the processor, the set command being a bit value for disabling or enabling access to the main cache array;
    switching the mode of operating the on-chip cache of the processor to enable testing of the processor using only the redundancy cache array when the main cache array is disabled;
    performing cache operations for testing of the processor through a limited entry cache in the redundancy cache array;
    reading data from the on-chip, cache in an operative mode; and
    reading data from the limited entry cache in a test mode.

11. The method for testing of claim 10, comprising:
    switching the mode of operating the on-chip cache of the processor to disable testing of the processor using only the redundancy cache array; and
    performing cache operations for the processor using the on-chip cache.

12. The method for testing of claim 10, wherein the limited entry cache comprises a single entry cache located at a predetermined wordline of the redundancy cache array.

13. The method for testing of claim 10, wherein the performing of cache operations comprises:
   storing a full word width in a data portion of the limited entry cache in the redundancy cache array;
   storing a tag portion of the limited entry cache in a tag memory;
   selecting one of the full word width or a portion of the full word width using addressing information in the tag portion of the limited entry cache.

14. The method for testing of claim 10, wherein the performing of cache operations comprises simultaneously writing or reading individual data values of a cache entry in multiple storage cells in the redundancy cache array.

15. The method for testing of claim 10, wherein an entry is read from the limited entry cache using a winner-take-all detection circuit.

16. An integrated circuit, comprising:
   a test circuit requiring access to a cache memory;
   the cache memory comprising a first array and a second array;
   a selection circuit for disabling the first array and enabling only the second array during testing of the test circuit; wherein the test circuit is coupled to only the second array for any cache memory access requirements during testing of the test circuit;
   a first data output line for reading data from the cache memory in an operative mode; and
   a second data output line for reading data from the second array in a test mode.

17. The integrated circuit of claim 16, wherein the integrated circuit comprises a microprocessor, the test circuit comprises a CPU circuit, the cache memory comprises an L2 cached integrated on a common semiconductor substrate with the CPU circuit and the second array comprises a single wordline of the cache memory.

18. The integrated circuit of claim 16, wherein the second array is used to perform data coalescing for the test circuit when the first array is disabled during testing of the test circuit.

19. The integrated circuit of claim 16, wherein the second array comprises a limited entry cache in which individual data values are stored in multiple memory cell locations.

* * * * *